United States Patent [19]

Kwarta

[11] Patent Number: 5,303,065
[45] Date of Patent: Apr. 12, 1994

[54] ASYNCHRONOUS, NONCONTINUOUS VIDEO CLOCK APPARATUS

[75] Inventor: Brian J. Kwarta, Pittsford, N.Y.

[73] Assignee: Eastman Kodak Company, Rochester, N.Y.

[21] Appl. No.: 784,332

[22] Filed: Oct. 29, 1991

[51] Int. Cl.⁵ .............................................. H04N 1/04
[52] U.S. Cl. ..................................... 358/409; 358/410
[58] Field of Search ............................. 358/409–412, 358/482–483

[56] References Cited

U.S. PATENT DOCUMENTS

| 4,268,867 | 5/1981 | Traino | 358/410 |
| 4,878,119 | 10/1989 | Beikirch et al. | 358/412 |

Primary Examiner—Stephen Brinich
Attorney, Agent, or Firm—David M. Woods

[57] ABSTRACT

The present invention is a clock signal apparatus for a document scanner that only produces a clock signal when pixel data is output. The apparatus includes a timing and control unit 94 that not only controls the sensor analog output process along with the conversion of the analog signals to digital data, but also provides a video clock signal only when the sensor data is present at the output of the scanner. The unit 94 also provides an intersensor period during which no pixel data is output and no clock signal is produced. The unit 94 supplies a horizontal synchronization signal before the video clock is started and a horizontal synchronization signal immediately after the last data is transmitted. The receiving unit 72 latches the data synchronous with the video clock signal. The video clock signal includes multiple edges allowing the various edges to control various stages of further processing of the sensor data.

9 Claims, 5 Drawing Sheets

ASYNCHRONOUS, NONCONTINUOUS VIDEO CLOCK APPARATUS

CROSS REFERENCES TO RELATED APPLICATIONS

This application is related to U.S. Applications incorporated by reference herein and entitled Uniformity Correction And Threshold or Halftoning Conversion Unit And Method and Method And Apparatus For Image Data Resolution Conversion both by Brian J. Kwarta, both assigned to Eastman Kodak Company and having Ser. Nos. 07/784,488 and 07,784,350, respectively.

BACKGROUND OF THE INVENTION

1. Field of the Invention

The present invention is directed to an apparatus for producing an asynchronous, noncontinuous video clock for a document scanner and scanner data processing device and, more particularly, to a scanner which sends pixel data to the processing device in groups corresponding to the sensors in the scanner and also sends a video clock with multiple edges for each pixel only when the pixel data is being sent.

2. Description of the Related Art

Conventionally a scanner for a facsimile machine, as illustrated in FIG. 1, includes a contact array of multiple sensors 10 which scan a document 12 through scanning optics 14. FIG. 1 shows four sensors 10 however, for convenience and ease of description the drawings and discussion herein will discuss two sensors where each sensor has only two pixels since the same operations with respect to more than two pixels within a sensor and more than two sensors can be extrapolated. The electronics in the conventional scanner remove the overlapping pixels, concatenate the pixels and transmit the output as video signals as illustrated in FIG. 2. The data transmission starts with a horizontal synchronization signal pulse 16 which initiates a continuous video clock signal (VC). The video clock signal clocks or produces pulses 17 for an initial period 18 called a front porch period. The front porch period is a variable number of dummy pixel outputs. Then in synchronism with this previously started video clock, the pixel data (P1 and P2) for the first sensor is sent 20, followed by sending 22 the pixel data (P3 and P4) for the second sensor. The conventional video clock signal has only a single rising and falling edge per pixel as disclosed in U.S. Pat. No. 5,003,380. Subsequent to the transmission of the last of the pixel data is a back porch period 24 during which the video clock continues. Period 24 can be of any length. At this time another horizontal synchronization pulse 26 occurs signifying the end of transmission of a single video line from the scanner. The prior art requirement for sending the continuous video clock VC in front of and behind the actual sensor data requires complicated logic, see U.S. Pat. No. 4,905,085, on the video data reception side to properly recognize when the pixel data for each sensor is present on the data bus. This logic includes a phased lock loop circuit, a local oscillator and front and back porch clock strip logic.

SUMMARY OF THE INVENTION

It is an object of the present invention to provide a scanner which produces a video clock signal only when the pixel data is being transmitted.

It is another object of the present invention to remove the wasted time of the back porch signal from the video clock signal.

It is also an object of the present invention to provide a synchronized video clock signal at a higher frequency than the pixel data, so that various edges of the video clock signal can be used to initiate various operations.

It is a further object of the present invention to eliminate the need for the logic associated with the continuous video clock signal.

It is an additional object of the present invention to allow the video signal to be continuous or discontinuous as desired.

The above objects can be attained by a timing and control unit that not only controls the sensor analog output process along with the conversion to digital data, but also provides a multiple edge video clock signal only when the sensor data is present at the output of the scanner. The unit supplies a horizontal synchronization signal before the video clock is started. The horizontal synchronization signal is sent immediately after the last data is output for the current video line, and before the successive video line is sent.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
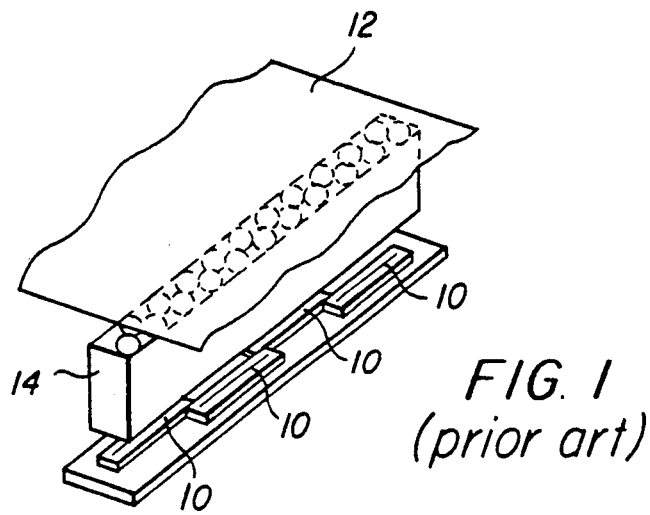
FIG. 1 illustrates a prior art contact type scanner head.
Figure 2:
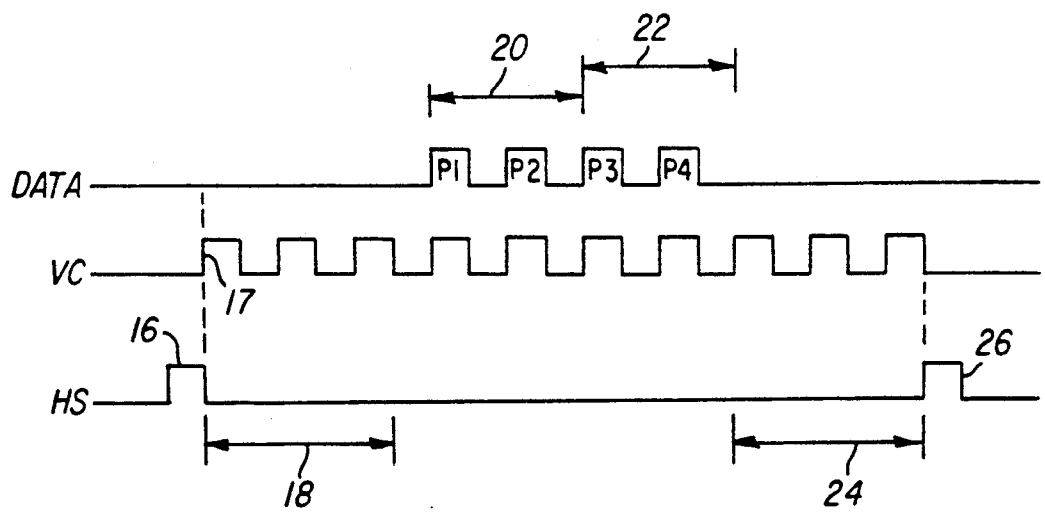
FIG. 2 illustrates a simplified version of the video signals produced by a scanner including the scan head of FIG. 1.
Figure 3:
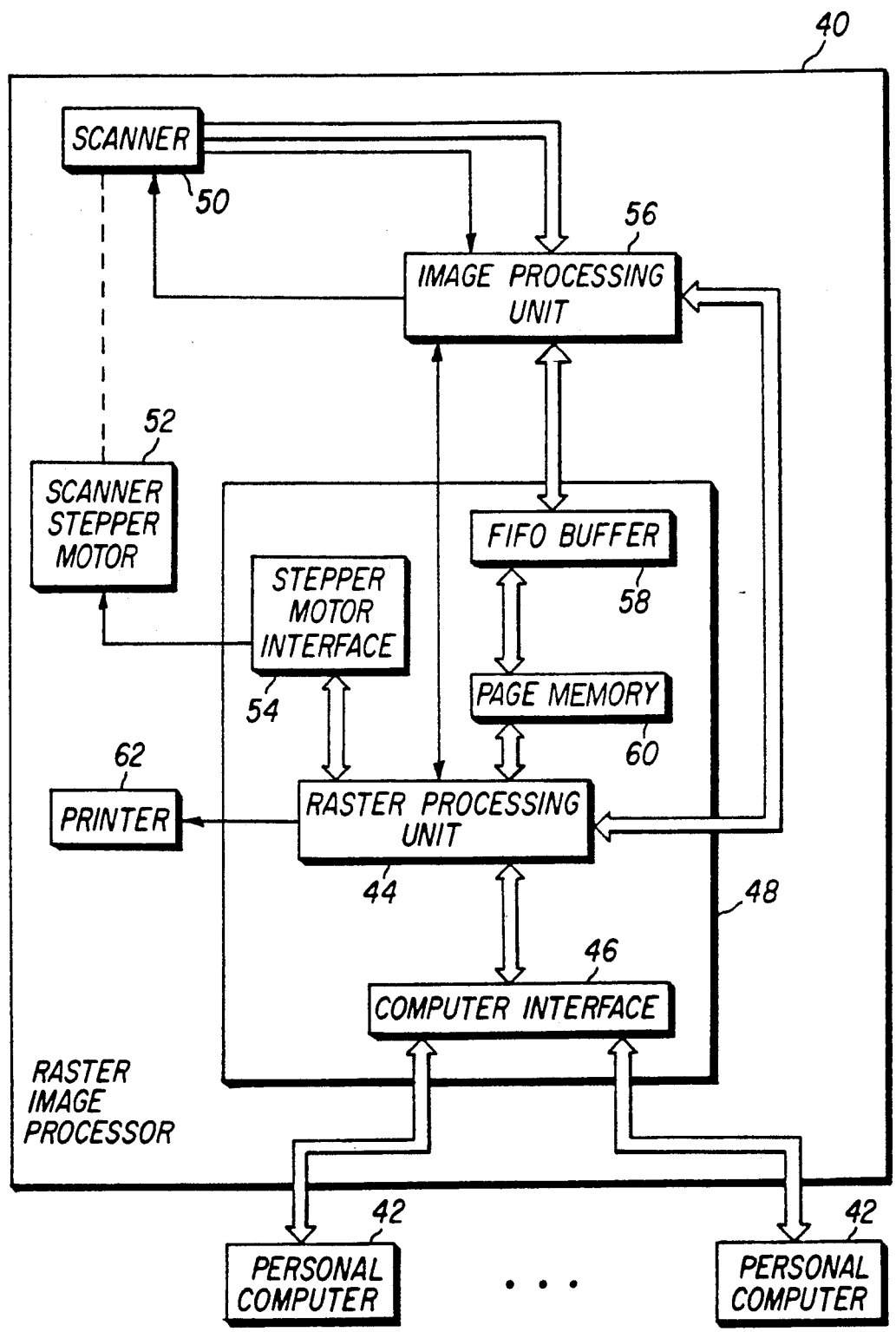
FIG. 3 illustrates the components of a scanner apparatus in which the present invention exists.

The present invention is part of a scanner apparatus 40 as illustrated in FIG. 3. The scanner apparatus 40 can be part of a printer, an electronic or optical copier, an optical character reader or a facsimile machine. A user at a personal computer 42 or some other type of device requests that a document be scanned by the scanner apparatus 40. This request is supplied to a raster processing unit 44 through an interface 46, both located in a raster image processor 48. The request indicates the resolution or dots per inch of the scanning operation. The resolution signal is supplied by the raster processing unit 44 to the scanner 46. The raster processing unit 44 initiates the scanning operation which includes scanning a white reference document. The unit 44 also controls a stepper motor 52 through a conventional stepper motor interface 54. A contact array sensor in the scanner 50 samples at a constant resolution (3400 pixels per line) but the sensor is moved by the stepper motor 52 at different speeds depending on the sampling resolution desired. At a resolution of 400 dots per inch the stepper motor moves at 2 inches/second, while at 100 dots per inch it moves at 8 inches/second. The raster processing unit 44 also indicates the resolution of the scan to an image processing unit 56. The scanner 50 scans the white reference document and also scans the document to be digitized and supplies digitized pixel values to the image processing unit 56 over a flexible cable along with a horizontal synchronization signal and pixel or video clock signals. The flexible cable allows the scanner head (sensor and associated electronics) to be moved across the document. The image processing unit 56, responsive to the video clock signals and the horizontal synchronization signal, performs the resolution conversion and any scaled thresholding or scaled dithering and supplies the converted data to the raster processing unit 44 through a first-in-first-out buffer 58 and a page memory 60. The page memory 60 should be large enough to hold a binarized, converted image at 400 dots per inch. A 2 megabyte memory is recommended. Once the image is stored in memory 60 it can be output to the computer 42 or to a printer 62 included in the scanner apparatus 40. The printer prints at 300 dots per inch using a photodiode array and an electrostatic belt.

Figure 4:
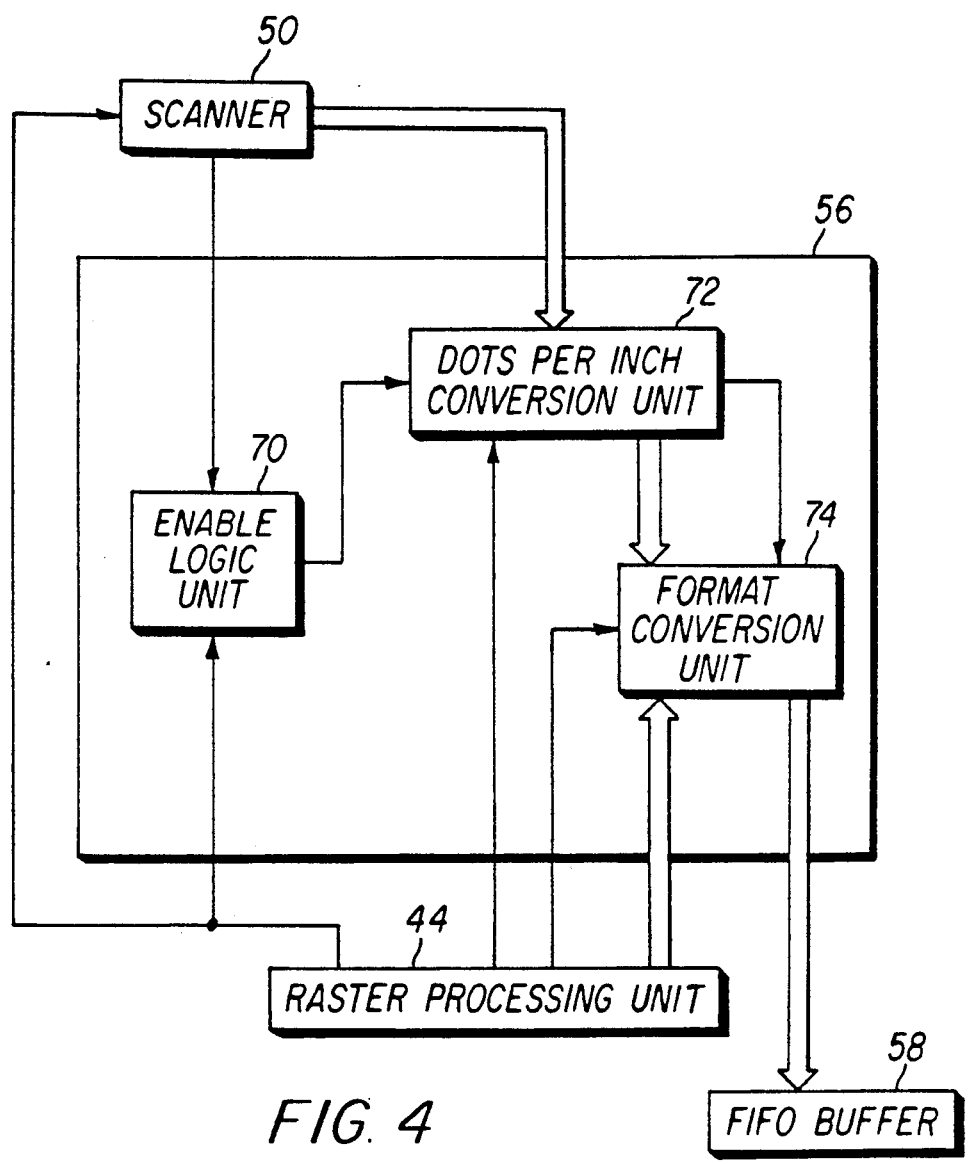
FIG. 4 illustrates in more detail the relationship between a scanner 50 and an image processing unit 56.

A more detailed illustration of the components included in the image processing unit 56 can be found in FIG. 4. The image processing unit 56 includes enable logic 70 which receives the horizontal synchronization and pixel clock signals from the scanner 50. The enable logic 70 based on an enable signal from the raster processing unit 44, supplies the pixel or video clock signal and horizontal synchronization signal to a dots per inch conversion unit 72. The enable signal is supplied when the raster processing unit 44 detects that the stepper motor 52 is in the desired position and the logic unit 70 then allows the pixel clock and horizontal synchronization signals to pass through to the dpi unit 72. The dots per inch conversion unit 72 converts the pixel data received from the scanner 50 into pixel data at the desired resolution. The details of the dpi conversion unit 72 can be found in the related Image Data Resolution Conversion application previously mentioned. The unit 72 supplies pixel data to a format conversion unit 74 along with the pixel clock and the horizontal synchronization signal. The details of the format conversion unit 74 can be found in the related Conversion Unit And Method application previously mentioned. The format converted data that is, the scaled thresholded pixel data or the scaled halftoned pixel data is supplied to the FIFO buffer 58.

Figure 5:
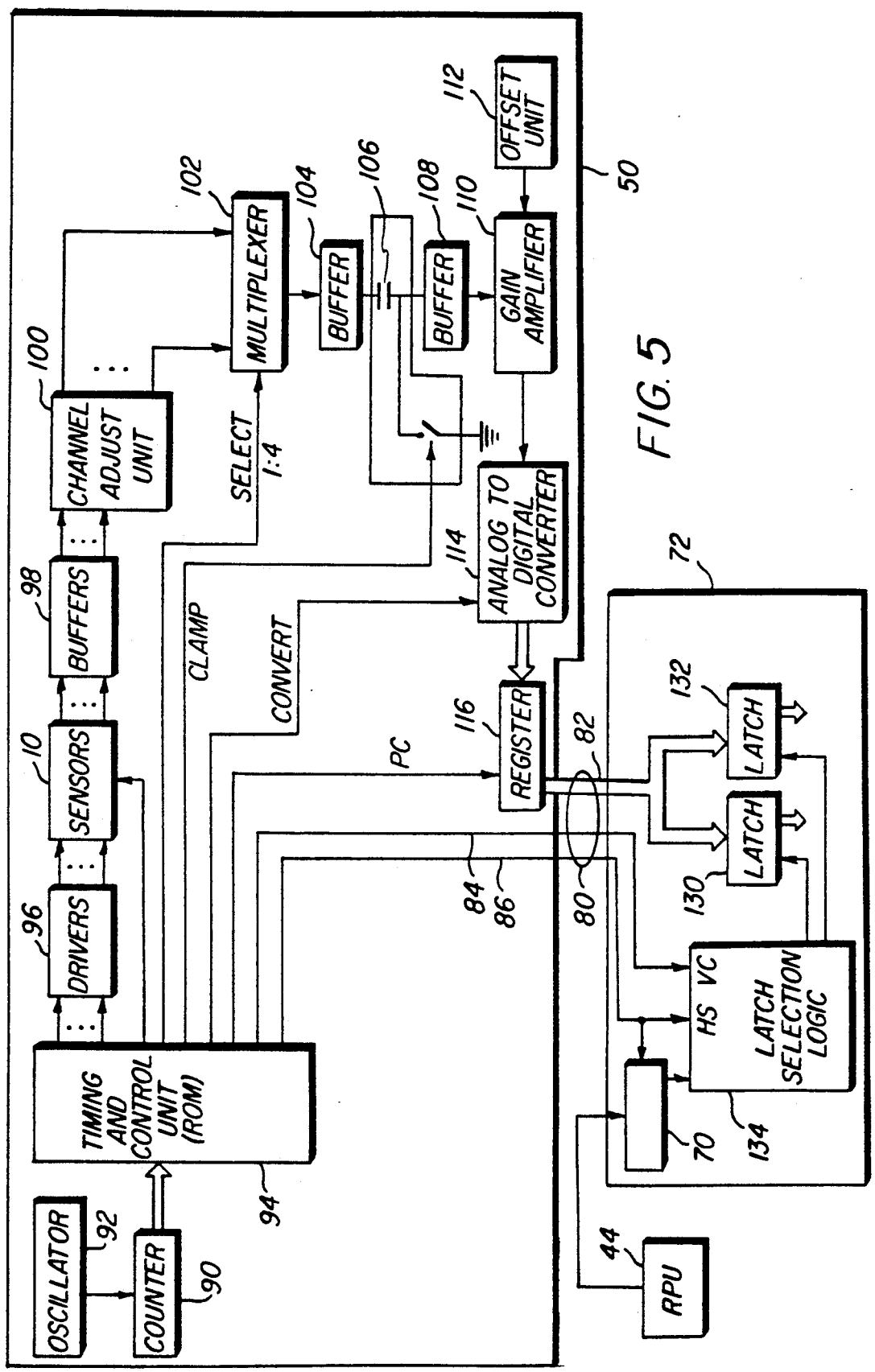
FIG. 5 illustrates the components of the present invention.

The scanner illustrated in FIG. 5 continuously outputs pixel data over a multiwire cable 80, including a bus 82, a video clock line 84 and a horizontal synchronization line 86, to the dpi conversion unit 72. Once a scan has been requested and the stepper motor 52 has moved the scanner into the desired starting position, the stepper motor interface 54 produces an in position signal which goes high and which the raster processing unit 44 passes to the enable logic 70 in the image processing unit 56. When the next horizontal synchronization pulse is received, the logic enables latches 130 and 132 to receive the pixel data. When the stepper motor reaches the requested end position, the in position signal goes low and the enable logic 70 disables latches 130 and 132. The cable 80, as previously mentioned, allows the scanner 50 to move across the document. At the beginning of each scan line a conventional counter 90 is reset and begins counting oscillator pulses produced by oscillator 92. The oscillator 92 preferably operates at 24 MHz and is stepped down to 12 MHz by a flip flop (not shown). The count produced by the counter 90 is provided to a timing and control unit 94 which is a conventional read only memory (ROM). The ROM 92 acts as a programmable clock generator. For cost efficiency purposes the oscillator 92, counter 90 and the timing logic that the ROM 94 emulates could be an application specific integrated circuit. The timing and control unit 94 in addition to producing the horizontal synchronization and video clock signals, responsive to the address supplied by the counter 90, also produces control signals for the various devices within the scanner 50. Drive signals are supplied to conventional drivers 96 which amplify the drive signals to cause the sensors 10 to output the sensor data in the desired order. The details of the drive signals for controlling the order of sensor data output can be found in an appropriate CCD image sensor data book. For example, the preferred group of sensors 10 for the scanner 50 is a Toshiba TCD118AC contact scanner array available from Toshiba of Japan. The drive signals for this sensor are described in detail in the Toshiba CCD Image Sensor data book, third edition, available from the Toshiba Corporation and incorporated by reference herein. The timing and control unit 94 also provides a sensor reset signal to the sensors 10. The sensors 10 output appropriate channel data to conventional channel buffers 98 which provide the analog channel signals through a channel adjustment unit 100 to a conventional multiplexer 102. The channel adjustment unit 100 provides an appropriate signal reduction adjustment through a conventional voltage divider arrangement (not shown) to normalize the sensor signals to a reference. The timing and control unit 94 provides channel select signals to the multiplexer 102 which selects one of the sensor channels and supplies the analog sensor signal to a conventional buffer 104. The output of the buffer 104 is supplied to a conventional clamp and hold circuit 106 which is activated by a clamp signal from the timing and control unit 94. The clamped sensor signal is supplied through a second conventional buffer 108 to a conventional gain amplifier 110 which boosts the sensor signal, responsive to an offset signal from a conventional offset unit 112, to a level which can be converted to a digital signal by a conventional digital to analog converter 114. The converter 114 converts the signal from the gain amplifier 110 responsive to a convert signal from the timing and control unit 94. The output of the converter 114 is stored in a conventional register 116 responsive to a pixel clock signal from the timing and control unit 94. The register 116 places the digitized pixel value on the bus 82, thereby supplying the pixel data over cable 80 to latches 130 and 132 in the dots per inch conversion unit 72. The latches 130 and 132 alternately store the pixel data responsive to latch control signals produced by latch selection logic 134 based on the horizontal synchronization and video clock signals produced by the timing and control unit 94 and the enable signal output by the enable logic 70.

Figure 6:
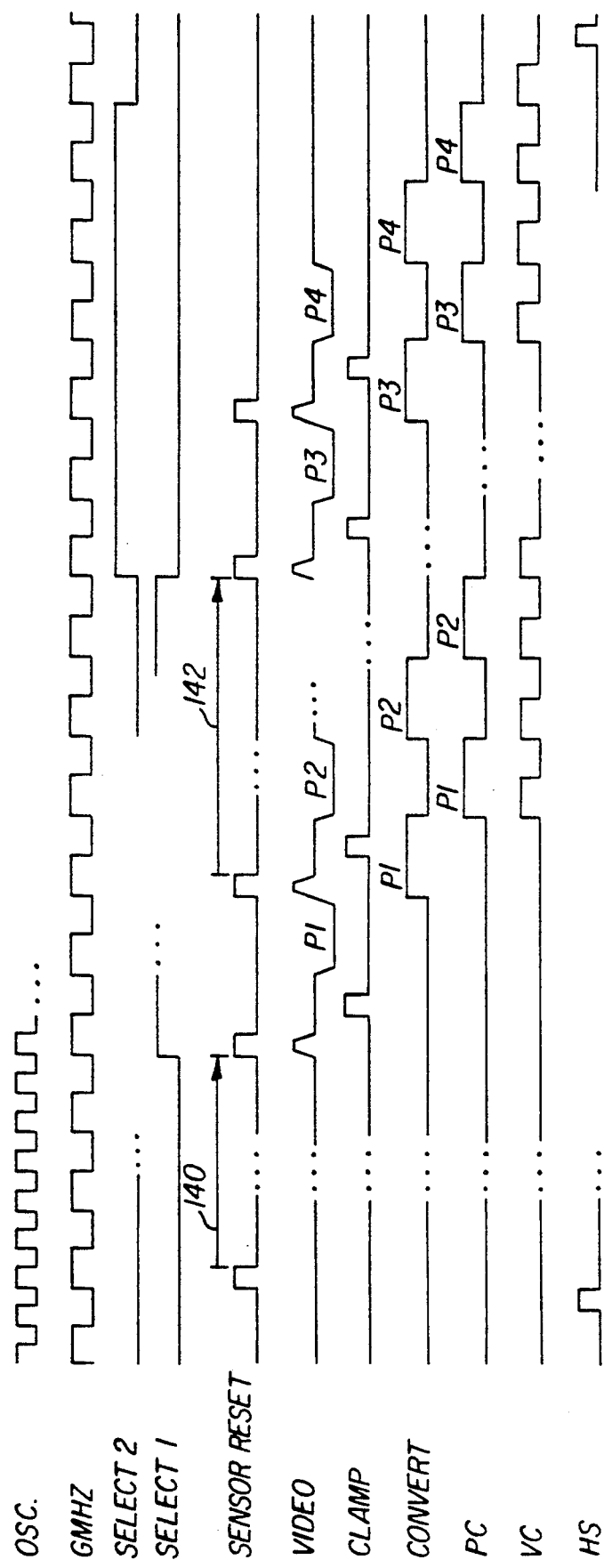
FIG. 6 illustrates the timing and control signals for the device of FIG. 5.

FIG. 6 illustrates the timing and control signals produced by the timing and control unit 94 in greater detail. As previously mentioned this description, for simplicity, illustrates the signals for two sensors with the first sensor producing pixel data values P1 and P2 and the second sensor producing pixel data values P3 and P4. In practice each sensor in the preferred sensor array produces an average of 850 pixels for a total of 3400 pixels. The horizontal synchronization signal (HS) is the first signal produced by the timing and control unit 94.

Once the horizontal synchronization signal has occurred, the timing and control unit 94 clocks for a front porch period 140 while producing the sensor reset signal. For contact type sensors, the front porch period 140 is used to line shift the sensor data to the horizontal shift register through seven vertical shift registers. See the sensor data book previously mentioned for further details concerning the reset signal, the horizontal synchronization signal and phase control signals used with the preferred sensor. A select signal (select 1) which selects the channel of the first sensor is also produced. The front porch period 140 is preferably 192 pixels long. Subsequent to the front porch period, the video signal for the first pixel Pl of the first sensor is produced. The clamp signal is produced during a dark period of the sensor, so that the output sensor signal, which changes in response to the analog level of the light sensed by the CCD imaging element of the sensor, is captured and held as a differential voltage compared to a dark level. The first clamp signal is followed by the convert signal which is out of phase by 180 degrees from the pixel clock signal. The video clock signal VC is produced at a higher frequency (shown as twice the frequency in FIG. 6) than the pixel clock. As a result, the extra edges, both the front and back edges, of the video clock signal can be used to initiate suboperations as the pixel data is received by the dots per inch conversion unit 72. Subsequent to the last pixel value from the first sensor is an intersensor period 142 which is preferably 16 pixels long. At the end of the interpixel period, the select signals change (in actual practice one of the control lines of the multiplexer goes low—select 1—and the other goes high—select 2) and thereby selects a different input channel of the multiplexer 102. The sensor reset, video, clamp, convert, pixel clock and video clock signals then repeat for the pixels of the second sensor. At the end of the last cycle of the video clock, the horizontal synchronization signal again occurs.

The present invention has been described using a video clock oscillating at twice the pixel data frequency, the video clock could oscillate at a much higher frequency providing more processing stage control signals in phase with the pixel data.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A clock apparatus for an input scanner, said apparatus comprising:

data means for outputting pixel data generated by the input scanner from a scanning operation; and clock means for producing a clock signal only when the pixel data is output by said data means.

2. An apparatus as recited in claim 1, wherein said clock means produces a synchronization signal prior t the output of the pixel data and immediately after the pixel data.

3. An apparatus as recited in claim 1, wherein the input scanner comprises plural sensors arrayed in a line scanning direction, and wherein the pixel data is output for the plural sensors and the pixel data for each sensor is separated by an intersensor period during which the clock signal is not produced.

4. An apparatus as recited in claim 1, wherein said clock signal includes more than two edges per pixel.

5. A scanner, comprising:

sensors for sampling a document and producing pixel sensor signals;

conversion means for converting the pixel sensor signals into pixel data and outputting the pixel data; and a timing and control unit providing control signals controlling the sensors and said conversion means, and producing a clock signal only in synchronism with the output of the pixel data.

6. A scanner as recited in claim 5, wherein said timing and control unit produces a horizontal synchronization signal, followed by a front porch interval and produces the horizontal synchronization signal immediately after the pixel data is output.

7. A scanner as recited in claim 5, wherein said timing and control unit comprises:

an oscillator;

a counter connected to said oscillator; and a read only memory connected to said counter, said sensors and said conversion means.

8. A document scanning apparatus, comprising:

a raster image processor;

a scanner connected to said raster image processor and comprising:

sensor means for sensing a document and outputting pixel data; and a timing and control unit connected to said sensor means and producing a clock signal only when the pixel data is output;

a cable connected to said sensor means and said timing and control unit; and an image processing unit connected to said processor and said cable, and said processing unit comprising a latch connected to said cable and storing the pixel data responsive to the clock signal.

9. A method for transmitting sensor pixel data, comprising the steps of:

(a) sampling a document and outputting pixel data; and (b) outputting a clock signal only when the pixel data is output.

* * * * *